4,659,182

United States Patent [19]
Aizawa

[11] Patent Number: 4,659,182

[45] Date of Patent: Apr. 21, 1987

[54] MULTILAYERED MATRIX LIQUID CRYSTAL DISPLAY APPARATUS WITH PARTICULAR COLOR FILTER PLACEMENT

[75] Inventor: Masanobu Aizawa, Yokohama, Japan

[73] Assignee: Stanley Electric Co., Ltd., Tokyo, Japan

[21] Appl. No.: 705,568

[22] Filed: Feb. 26, 1985

[30] Foreign Application Priority Data

Mar. 7, 1984 [JP] Japan .................................. 59-43258

[51] Int. Cl.⁴ .............................................. G02F 1/13
[52] U.S. Cl. .................................. 350/339 F; 350/335
[58] Field of Search ........................... 350/335, 339 F

[56] References Cited

U.S. PATENT DOCUMENTS

| | | | |
|---|---|---|---|
| 4,231,640 | 11/1980 | Funada et al. | 350/335 X |
| 4,335,936 | 6/1982 | Nonomura et al. | 350/335 |
| 4,436,379 | 3/1984 | Funada et al. | 350/335 X |
| 4,443,062 | 4/1984 | Togashi et al. | 350/332 |

Primary Examiner—John K. Corbin
Assistant Examiner—Richard Gallivan
Attorney, Agent, or Firm—Frishauf, Holtz, Goodman & Woodward

[57] ABSTRACT

A multilayered liquid crystal display device includes a front substrate, a rear substrate and at least one intermediate substrate interposed therebetween, respective spaces being formed between the intermediate substrate and the front substrate, and between the intermediate substrate and the rear substrate. Liquid crystal layers are in the spaces between the substrates so that the display surfaces provide an overall display. Intersecting signal and scanning electrodes are arranged on opposed mutually facing surfaces of the intermediate and rear substrate and of the intermediate and front substrate. Color layers are arranged in an optical path corresponding to the intersecting portions of the signal and scanning electrodes, but on the opposite side of the intermediate substrate on which the associated intersecting signal and scanning lines are located. The color layers are not interposed between their associated intersecting signal and scanning electrodes. The display is arranged in adjacent sections, each adjacent section being on opposite sides of the intermediate substrate, thereby producing a uniform display surface.

16 Claims, 4 Drawing Figures

MULTILAYERED MATRIX LIQUID CRYSTAL DISPLAY APPARATUS WITH PARTICULAR COLOR FILTER PLACEMENT

BACKGROUND OF THE INVENTION

The present invention relates to a multilayered matrix-type liquid crystal display apparatus and, more particularly, to such a display apparatus which is capable of providing a clear color dot display.

As partially shown in FIG. 1, in a conventional multilayered matrix liquid crystal display apparatus for performing a color dot display, a group of electrodes b are formed on a glass substrate a constituting the liquid crystal display apparatus, and color layers c are formed on the group of electrodes b by coating an insulating dye thereon by electrodeposition or photoetching.

In order to obtain a clear color display, the color layers c must have a certain thickness. However, when the color layers c have a thickness exceeding the proper thickness for a satisfactory color display, the capacitance of the dye is increased and the applied voltage waveform for driving the liquid crystal display is distorted, thus degrading the display contrast. On the contrary, when the color layers c are rendered thin to such a degree that no increase in capacitance is observed, the colors of the color layers c themselves become too light, and a clear color display cannot be obtained.

In a prior art liquid crystal display apparatus of the type described above, one or both types of scanning and signal electrode groups are arranged on each substrate. Therefore, when the display surface is observed from an oblique direction, the dot layer of the first layer must not deviate from that of the second layer, and a step must not be formed between the displays of the first and second layers. This may be achieved by rendering the thickness of an intermediate substrate as thin as possible. However, the mechanical strength of terminal portions formed at one or a plurality of sides of this substrate must be guaranteed. The method of rendering thin the intermediate substrate is not practical unless the mechanical strength of these terminal portions is guaranteed.

The present invention has been made in consideration of the above and has as its object to provide a multilayered matrix liquid crystal display apparatus which can provide a clear color dot image and which does not cause a display deviation or step.

SUMMARY OF THE INVENTION

A multilayered liquid crystal display apparatus includes a front substrate, a rear substrate and at least one intermediate substrate interposed therebetween. Liquid crystal layers are interposed between the substrates such that display surfaces in units of the liquid crystal layers provide an overall display. A group of color layers for rendering the displays in units of the liquid crystal layers into color displays are arranged in an optical path corresponding to the displays in units of the liquid crystal layers and at sides different from the liquid crystal layers corresponding thereto, thus producing a uniform display surface with a clear color dot display.

DETAILED DESCRIPTION

Figure 2:
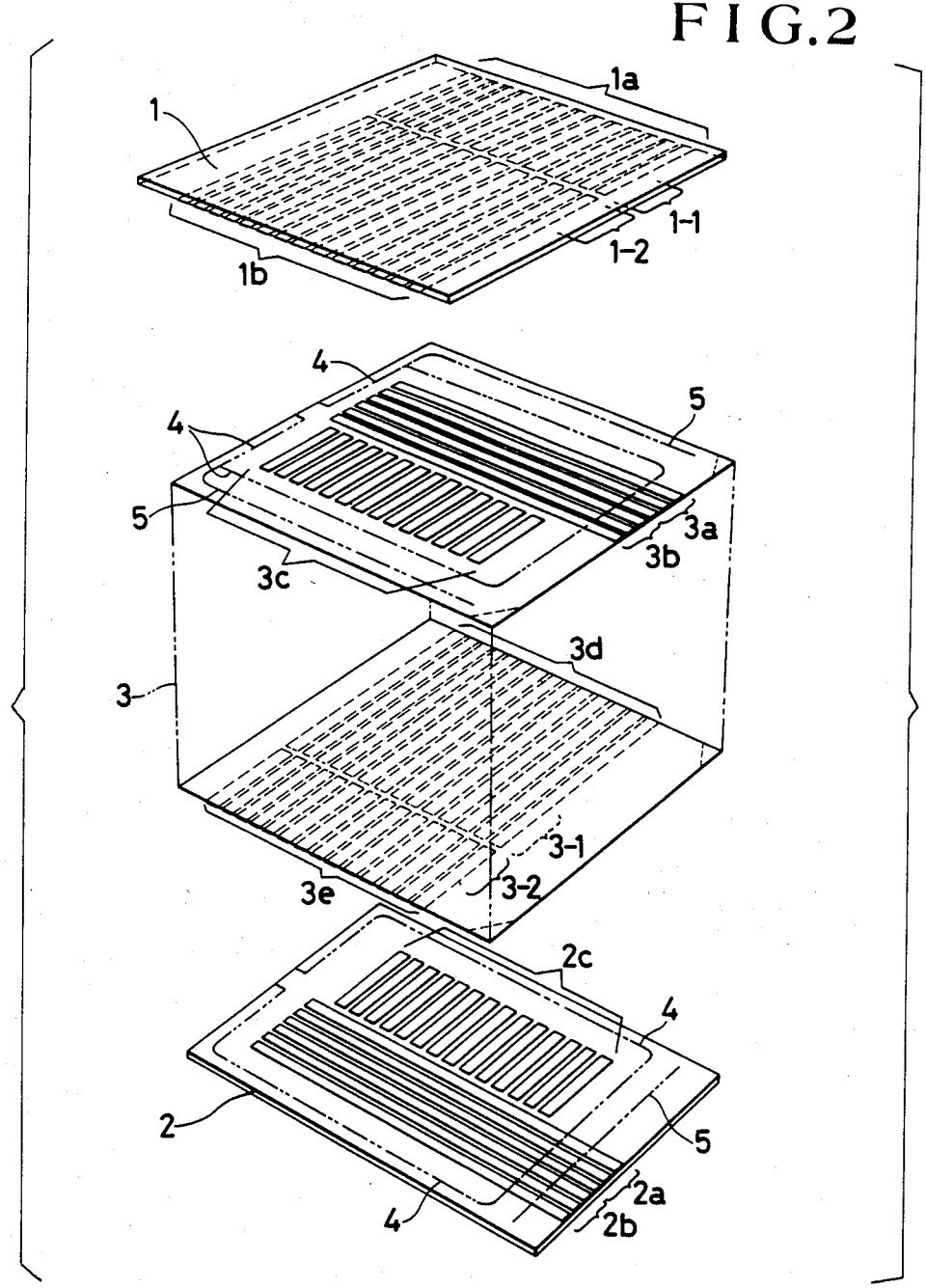
FIG. 2 is a view showing the outer appearance of substrates used in the apparatus according to the present invention.

FIG. 2 is an exploded view showing a group of electrodes formed on each substrate and a pattern of a group of color layers when two liquid crystal layers are formed. A front substrate 1 is obtained by cutting a glass plate into a rectangle; a rear substrate 2 is obtained in a similar manner; and an intermediate substrate 3 is obtained in a similar manner and has a thickness of about 0.2 mm. In order to allow easy understanding of the structure of the intermediate substrate 3, the front and rear surfaces of the substrate 3 are illustrated separated from each other.

The front substrate 1 has on its surface a first signal electrode group 1a and a second signal electrode group 1b, which are formed by depositing a transparent conductive film such as $In_2O_3$ or the like by sputtering or the like and treating the film by photoetching or the like. The intermediate substrate 3 has a first scanning electrode group 3a and a second scanning electrode group 3b at the upper half portion of its surface opposing the rear surface of the front substrate 1. The first and second scanning electrode groups 3a and 3b cross the first and second signal electrode groups 1a and 1b, respectively. When the front substrate 1 is superposed on the intermediate substrate 3 with a first liquid crystal layer therebetween (to be described later), the first scanning electrode group 3a crosses a distal end region 1—1 of the first signal electrode group 1a, and likewise the second scanning electrode group 3b crosses a distal end region 1-2 of the second electrode group 1b.

A color layer group 3c of an insulating dye is formed by photoetching on the lower half portion of the surface of the intermediate substrate 3 which opposes the rear surface of the front substrate 1. As will be described later, the color layer group 3c serves to impart color to a display obtained with a second liquid crystal layer to be described later and interposed between the intermediate substrate 3 and the rear substrate 2.

A third signal electrode group 3d and a fourth signal electrode group 3e are formed on the rear surface of the intermediate substrate 3 by a similar means (i.e., photoetching).

A third scanning electrode group 2a and a fourth scanning electrode group 2b are formed on the lower half portion of the surface of the rear substrate 2 which opposes the intermediate substrate 3 such that they cross portions of the third and fourth signal electrode groups 3d and 3e, respectively, of the intermediate substrate 3. In a similar manner to that described above, the third scanning electrode group 2a crosses a distal end region 3-1 of the third signal electrode group 3d, and the fourth scanning electrode group 2b crosses a distal end region 3-2 of the fourth signal electrode group 3e. Note that the above description corresponds to the case wherein the intermediate substrate 3 and the rear substrate 2 are superposed with the second liquid crystal layer therebetween.

On the upper half of the surface of the rear substrate 2 which opposes the intermediate substrate 3, a color layer group 2c of an insulating dye is formed by the same method as used for forming the color layer group 3c. As will be described later, the color layer group 2c serves to impart color to a display obtained by the first liquid crystal layer interposed between the intermediate substrate 3 and the front substrate 1. Therefore, when the front substrate 1, the intermediate substrate 2 and the rear substrate 3 are superposed at a predetermined relationship, the color layer group 2c has a width corresponding to a width of electrodes of the first and second signal electrode groups 1a and 1b formed on the front substrate 1. Similarly, the color layer group 3c also has a width corresponding to a width of electrodes of the third and fourth signal electrodes 3d and 3e on the rear surface. An adhesive 4 is used for sealing the substrates; and an auxiliary adhesive 5 is used for the intermediate substrate 3.

The intermediate substrate 3 insulates the electrodes on one side thereof from the electrodes on the other side, thereof, so that energization of scanning electrode groups 2a and 2b does not cause generation of a display dot due to the energization of crossing energized electrodes of the signal electrode group 1b. The intermediate substrate 3 isolates the liquid crystal sections 6, 7 from each other in the thickness direction of the device. The color layers for a given display are arranged at a side of the intermediate substrate different from the liquid crystal layers corresponding thereto, so that the color layers are not interposed between the scanning and signal electrodes of the liquid crystal section with which the respective color layers are associated.

The signal electrodes and the scanning electrodes in the respective single planes are divided into two groups for the following reason. When a dot matrix liquid crystal display device is driven in a time-sharing manner, a maximum of 64 scanning electrodes can be used from the viewpoint of the response time of the liquid crystal itself. Therefore, separate additional groups of scanning electrodes (i.e., separate additional systems) must be used to enlarge a display area. Although theoretically three or more separate display devices of the type described above may be used, space for connection of electrodes cannot be secured and the manufacture of the device becomes difficult. Therefore, when three of four display devices are required, they are formed on the second layer. If still more electrodes are required, they are formed on the third layer to allow for enlargement of the display area.

The color layer group 2c is formed on the rear substrate 2, and the color layer group 3c is formed on the intermediate substrate 3 so as not to be interposed between the liquid crystal layers (which are driven in a time-shared manner) and to prevent adverse effects of capacitance of the dye itself.

Figure 3:
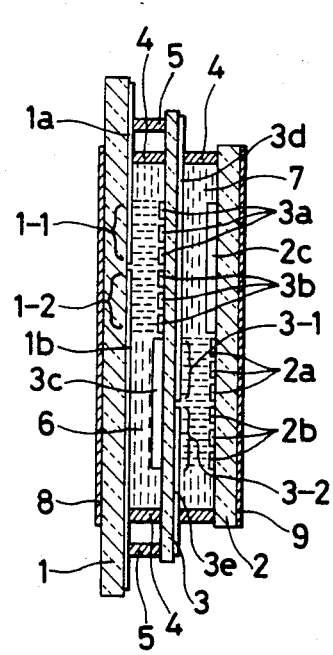
FIG. 3 is a side sectional view of the apparatus according to the present invention.
Figure 1:
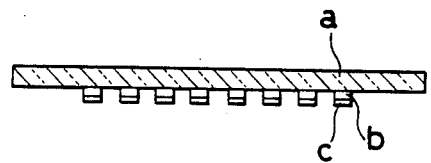
FIG. 1 is a sectional view of a substrate of a conventional apparatus.

An embodiment of a bilayered matrix liquid crystal device using substrates, each according to the above principle, will be described with reference to FIG. 3. In each substrate, an organic thin film of polyamide or the like is formed on electrode groups on the substrate and rubbed such that the orientation axes of the opposing surfaces of the substrate are perpendicular to each other. Between respective adjacent substrates, an adhesive 4 is sealed through a gap control agent of inorganic particles. A first liquid crystal layer 6 of TN liquid crystal is sealed between the front substrate 1 and the intermediate substrate 3, and a second liquid crystal layer 7 of a TN liquid crystal is interposed and sealed between the intermediate substrate 3 and the rear substrate 2, thereby providing a bilayered structure. A polarizing plate 8 is arranged on the front surface of the front substrate 1, and a polarizing plate 9 is arranged on the rear surface of the rear substrate 2. The polarization axes of the polarizing plates 8 and 9 are perpendicular to each other.

The upper half of a display appearing on the surface of the front substrate 1 is provided by the first liquid crystal layer 6, while its lower half is provided by the second liquid crystal layer 7, thereby providing the overall display in units of display surfaces of the liquid crystal layers. More specifically, when a voltage is not applied to the first liquid crystal layer 6 nor to the second liquid crystal layer 7, light incident on the rear substrate 2 from its back side is polarized by the polarizing plate 9 in one direction, rotated through 90° by the second liquid crystal layer 7, and is further rotated through 90° by the first liquid crystal layer 6. Then, the resultant light becomes polarized light perpendicular to the polarizing direction of polarizing plate 8 and the incident light is thus totally blocked. When a voltage is applied to the first and second signal electrode groups 1a and 1b and the first and second scanning electrode groups 3a and 3b opposing thereto in order to drive the first liquid crystal layer 6, liquid crystal molecules in the ranges of the distal end regions 1-1 and 1-2 are oriented in a direction perpendicular to the front substrate 1 and the intermediate substrate 3. Then, the optical rotary effect is lost and the light rotated by the second liquid crystal layer 7 in a predetermined direction is passed and becomes incident on the polarizing plate 8. In this case, since the polarization directions are the same, a dot display is obtained which appears at the portions at which the first and second signal electrode groups 1a and 1b and the first and second scanning electrode groups 3a and 3b cross. The display is further rendered into a color display by the color layer group 2c. This effect is the same even when the second liquid crystal layer 7 is driven. In this case, the color display is obtained with the color layer group 3c.

In this manner, the color layer groups 2c and 3c are arranged in the optical path for obtaining a dot display and are at positions not interposed between their respective associated signal and scanning electrode groups. That is, color layer 3c is not interposed between cooperating electrodes 2a, 2b and its intersecting associated electrode sections 3-1 and 3-2. Color layer group 2c is not interposed between electrodes 3a, 3b and their associated intersecting electrode sections 1-1, 1-2. Therefore, even if the color layer groups 2c and 3c have a sufficient thickness to provide good color characteristics for viewing, the influence of capacitances thereof does not appear in the waveform of the applied drive voltage and will not distort the applied drive voltage.

The color layer group 2c must correspond to the distal end regions 1-1 and 1-2 of the first and second signal electrode groups 1a and 1b for driving the first liquid crystal layer 6. Therefore, the color layer group 2c can be formed on the rear surfaces of the first and second scanning electrode groups 3a and 3b of the intermediate substrate 3, i.e., on the third signal electrode group 3d in the second liquid crystal layer 7 at the opposite side of the first liquid crystal layer 6. Similarly, the color layer group 3c can alternatively be formed on the second signal electrode group 1b of the front substrate 1. Then, the waveform of the voltage applied to the distal end regions 1-1 and 1-2 of the first and second signal electrode groups 1a and 1b and to the first and second scanning electrodes 3a and 3b crossing them and forming a dot display will not be distorted. In addition, the waveform of the voltage applied to the distal end regions 3-1 and 3-2 of the third and fourth signal electrode groups 3d and 3e and to the third and fourth scanning electrode groups 2a and 2b crossing them and forming a dot display will not be distorted.

Figure 4:
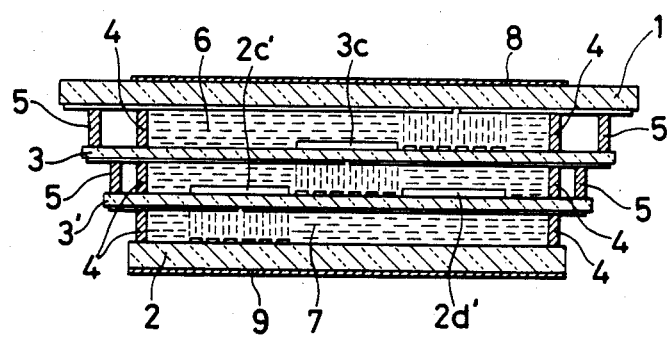
FIG. 4 is a side sectional view of another embodiment of the apparatus according to the present invention.

FIG. 4 shows an embodiment wherein three liquid crystal layers are used; an additional intermediate substrate 3' is added. In this embodiment, the color layer group 3c is formed on the intermediate substrate 3, and color layers 2c' and 2' are formed on the additional intermediate substrate 3'. With this structure, as in the case of the former embodiment, the adverse effects of the capacitance of the color layer is prevented.

Since the intermediate layer thickness is as small as about 0.2 mm, the depth difference between the first liquid crystal layer 6 and other liquid crystal layers therebehind is small, and a flat display without a step can be obtained. According to the apparatus of the present invention, in order to secure a good mechanical strength of the intermediate substrate 3 and 3', an auxiliary adhesive 5 is used to fix the intermediate substrates to the adjacent substrates in addition to the adhesive 4 for sealing. Therefore, the mechanical strength of the terminal portion formed at a connecting substrate side for forming each electrode group is increased, and the problem of strength with a thin intermediate substrate(s) is solved. In order to obtain a uniform display along the entire display surface, the intermediate substrate(s) preferably has a thickness of 0.3 mm or less. Considering processes during manufacture, an intermediate substrate having a thickness of 0.1 mm or less is difficult to manufacture. Therefore, the thickness of the intermediate substrate(s) is selected to fall within the range of 0.1 to 0.3 mm, and preferably is about 0.2 mm.

In this manner, according to the present invention, the thickness of the intermediate substrate(s) constituting a multilayered matrix liquid crystal display apparatus falls within the range of 0.1 to 0.3 mm, and the color layer group for rendering a dot display and a color display is formed at the side of the liquid crystal group different from that for forming the dot display and is in the optical path for forming the dot display. Therefore, the display surface becomes uniform, and a clear color dot display can be obtained.

In the above embodiments, all of the scanning electrodes and signal electrodes are preferably formed by depositing a transparent conductive film of $In_2O_3$ or the like by sputtering and treating the film by photoetching or the like.

The color layer groups are made of materials which are in general used for liquid crystals. All of the color layer groups are made of the same materials or different materials. Selection of material or materials depends upon the color or colors to be used for the liquid crystals. All of the color layer groups may be the same color, but could, if desired, be of different color.

I claim:

1. A multilayered liquid crystal display device having a color display, comprising;
    a front substrate of substantially transparent, substantially non-conductive material;
    a rear substrate of substantially transparent, substantially non-conductive material;
    at least one intermediate substrate of substantially transparent, substantially non-conductive material interposed between said front and rear substrates, with respective spaces being provided between said intermediate substrate and said front and rear substrates;
    a first liquid crystal layer in said space between said front substrate and said intermediate substrate;
    a second liquid crystal layer in said space between said rear substrate and said intermediate substrate;
    said intermediate and front substrates having opposed confronting surfaces, and said intermediate and rear substrates having opposed confronting surfaces;
    first signal electrodes on one of said opposed confronting surfaces of said front and intermediate substrates;
    first scanning electrodes on the other of said confronting surfaces of said front and intermediate substrates, at least portions of said first signal electrodes and first scanning electrodes being arranged to intersect each other in a matrix-like fashion, said first liquid crystal layer being interposed between said first signal electrodes and said first scanning electrodes;
    signal electrodes on one of said opposed confronting surfaces of said rear and intermediate substrates;
    second scanning electrodes on the other of said confronting surfaces of said rear and intermediate substrates, at least portions of said second signal electrodes and second scanning electrodes being arranged to intersect each other in a matrix-like fashion, said second liquid crystal layer being interposed between said second signal electrodes and said second scanning electrodes;
    first color layer means arranged opposite the intersecting areas of said first signal and first scanning electrodes, said first color layer means being on the opposite side of said intermediate substrate from said first signal and first scanning electrodes so as not to be interposed between said first signal and first scanning electrodes;
    second color layer means arranged opposite the intersecting areas of said second signal and second scanning electrodes, said second color layer means being on the opposite side of said intermediate substrate from said second signal and second scanning electrodes so as not to be interposed between said second signal and second scanning electrodes;
    whereby a liquid crystal display having a uniform display surface and a clear color display is provided.

2. The display device of claim 1, wherein said intermediate substrate is an insulating member for electrically insulating said first signal and first scanning electrodes from said second signal and second scanning electrodes.

3. The display device of claim 1, wherein:
    said first signal electrodes comprise first and second groups of first signal electrodes which are arranged in the same direction as each other, but which are electrically insulated from each other, said first and second groups of first signal electrodes having distal ends which are adjacent each other and spaced from each other; and
    said first scanning electrodes comprise first and second groups of first scanning electrodes which are respectively arranged to intersect said distal ends of said first and second groups of said first signal electrode.

4. The display device of claim 3, wherein:

said second signal electrodes comprise first and second groups of second signal electrodes which are arranged in the same direction as each other, but which are electrically insulated from each other, said first and second groups of second signal electrodes having distal ends which are adjacent each other and spaced from each other; and said second scanning electrodes comprise first and second groups of second scanning electrodes which are respectively arranged to intersect said distal ends of said first and second groups of said second signal electrodes.

5. The display device of claim 4, wherein said first color layer means is arranged behind and in registration with said first scanning electrodes; and said second color layer means is arranged behind and in registration with said second scanning electrodes.

6. The display device of claim 5, wherein said signal and scanning electrodes all comprise a plurality of substantially straight, separated, elongated electrode members, and wherein said first and second color layer means each comprises a plurality of substantially straight, separated, elongated color layers.

7. The display device of claim 4, wherein said first signal electrodes are arranged on said front substrate and said first scanning electrodes are arranged on a surface of said intermediate substrate confronting said front substrate; and wherein said second scanning electrodes are arranged on a surface of said rear substrate, and said second signal electrodes are arranged on the surface of said intermediate substrate confronting said rear substrate.

8. The display device of claim 4, wherein said first color layer means is arranged in an optical path corresponding to the display generated by said intersecting first signal electrodes and first scanning electrodes, and said second color layer means is arranged in the optical path corresponding to the display generated by said intersecting second signal electrodes and second scanning electrodes.

9. The display device of claim 1, wherein said first signal electrodes are arranged on said front substrate and said first scanning electrodes are arranged on a surface of said intermediate substrate confronting said front substrate; and wherein said second scanning electrodes are arranged on a surface of said rear substrate, and said second signal electrodes are arranged on the surface of said intermediate substrate confronting said rear substrate.

10. The display device of claim 1, wherein said first and second color layer means are arranged adjacent each other in a direction perpendicular to the thickness direction of said display device so as to provide a substantially continuous color display.

11. The display device of claim 10, wherein said intersecting areas of said respective signal and scanning electrodes are arranged adjacent each other in a direction perpendicular to the thickness of said display device, said intersecting areas being in the optical path corresponding to said respective color layer means.

12. The display device of claim 1, comprising first and second intermediate substrates interposed between said front substrate and said rear substrate said first and second intermediate substrates being spaced from each other and a third liquid crystal layer being in said space between said first and second intermediate substrates; and further comprising additional signal electrodes and scanning electrodes on confronting surfaces of said first and second intermediate substrates, and an additional color layer means arranged opposite intersecting areas of said additional signal and scanning electrodes and on the opposite side of at least one of said intermediate substrates on which said additional signal and scanning electrodes are arranged, said additional color layer means being associated with said additional signal and scanning electrodes.

13. The display device of claim 12, wherein said first, second and additional color layer means are arranged adjacent each other in a direction perpendicular to the thickness direction of said display device so as to provide a substantially continuous color display.

14. The display device of claim 13, wherein said intersecting areas of said respective signal and scanning electrodes are arranged adjacent each other in a direction perpendicular to the thickness direction of said display device, said intersecting areas being in the optical path corresponding to said respective associated color layer means.

15. The display device of claim 12, wherein said first color layer means is arranged in an optical path corresponding to the display generated by said intersecting first signal electrodes and first scanning electrodes; said second color layer means is arranged in the optical path corresponding to the display generated by said intersecting second signal electrodes and second scanning electrodes; and said additional color layer means is arranged in the optical path corresponding to the display generated by said intersecting additional signal electrodes and additional scanning electrodes.

16. The display device of claim 1, wherein said first color layer means is arranged in an optical path corresponding to the display generated by said intersecting first signal electrodes and first scanning electrodes, and said second color layer means is arranged in the optical path corresponding to the display generated by said intersecting second signal electrodes and second scanning electrodes.

* * * * *